United States Patent
Kim et al.

(10) Patent No.: US 11,770,873 B2
(45) Date of Patent: *Sep. 26, 2023

(54) METHOD FOR KEEPING MOBILE INITIATED CONNECTION ONLY MODE USER EQUIPMENT IN CONNECTED MODE

(71) Applicant: Samsung Electronics Co., Ltd., Suwon-si (KR)

(72) Inventors: Sunghoon Kim, Seoul (KR); Youngkyo Baek, Seoul (KR); Jungje Son, Yongin-si (KR); Hoyeon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,043

(22) Filed: May 27, 2022

(65) Prior Publication Data

US 2022/0287148 A1   Sep. 8, 2022

Related U.S. Application Data

(63) Continuation of application No. 16/492,354, filed as application No. PCT/KR2018/002749 on Mar. 8, 2018, now Pat. No. 11,350,482.

(30) Foreign Application Priority Data

Mar. 10, 2017   (KR) .................. 10-2017-0030561
May 2, 2017     (KR) .................. 10-2017-0056430
Jul. 18, 2017   (KR) .................. 10-2017-0090961

(51) Int. Cl.
  *H04W 4/00*    (2018.01)
  *H04W 76/38*   (2018.01)
  (Continued)

(52) U.S. Cl.
  CPC .............. *H04W 76/38* (2018.02); *H04W 8/08* (2013.01); *H04W 48/16* (2013.01); *H04W 76/25* (2018.02); *H04W 76/27* (2018.02)

(58) Field of Classification Search
  None
  See application file for complete search history.

(56) References Cited

U.S. PATENT DOCUMENTS

2012/0329458 A1*  12/2012  Hjelmgren ............ H04W 72/29
                                                         455/436
2015/0173013 A1*  6/2015   Iwai .................. H04W 52/0232
                                                         455/418
(Continued)

FOREIGN PATENT DOCUMENTS

EP       3 528 532 A1     8/2019
EP       3 547 769 A1    10/2019
(Continued)

OTHER PUBLICATIONS

Nokia et al., 'Way forward for change of AMF/Control of N2 persistence', S2-171017, 3GPP TSG SA WG2 Meeting #119, Feb. 13-17, 2017, Dubrovnik, Croatia.

(Continued)

*Primary Examiner* — Bob A Phunkulh
(74) *Attorney, Agent, or Firm* — Jefferson IP Law, LLP

(57) ABSTRACT

The present disclosure relates to a communication technique for converging an IoT technology with a 5G communication system for supporting a higher data transfer rate beyond a 4G system, and a system therefor. The present disclosure can be applied to an intelligent service (e.g. a smart home, a smart building, a smart city, a smart car or connected car, healthcare, digital education, a retail business, a security and safety-related service, etc.) on the basis of a 5G communication technology and an IoT-related technology. The present disclosure provides a method wherein, after a MICO (Continued)

mode terminal establishes a connection and transmits data, the MICO mode terminal can be kept in a connected mode state, rather than entering an idle mode, in order to provide for a case where slightly delayed response traffic occurs according to the type of application or service.

16 Claims, 9 Drawing Sheets

(51) Int. Cl.
  *H04W 76/25*  (2018.01)
  *H04W 76/27*  (2018.01)
  *H04W 8/08*  (2009.01)
  *H04W 48/16*  (2009.01)

(56) References Cited

U.S. PATENT DOCUMENTS

| | | | |
|---|---|---|---|
| 2016/0044488 A1* | 2/2016 | Kim | H04W 76/14 |
| | | | 370/328 |
| 2016/0095059 A1* | 3/2016 | Salvador | H04L 47/29 |
| | | | 370/229 |
| 2016/0113057 A1* | 4/2016 | Haneji | H04W 4/70 |
| | | | 370/328 |
| 2016/0286466 A1 | 9/2016 | Huang et al. | |
| 2016/0381639 A1 | 12/2016 | Kim et al. | |
| 2017/0013515 A1* | 1/2017 | Bangolae | H04W 36/0055 |
| 2017/0324652 A1 | 11/2017 | Lee et al. | |
| 2017/0332438 A1* | 11/2017 | Olsson | H04W 28/12 |
| 2018/0183655 A1* | 6/2018 | Gupta | H04W 76/19 |
| 2018/0227978 A1 | 8/2018 | Keller et al. | |
| 2018/0249528 A1 | 8/2018 | Kuge et al. | |
| 2018/0376445 A1 | 12/2018 | Yoon et al. | |
| 2019/0028959 A1 | 1/2019 | Svedevall et al. | |
| 2019/0037636 A1 | 1/2019 | Kim et al. | |
| 2019/0268895 A1 | 8/2019 | Keller et al. | |
| 2019/0394633 A1 | 12/2019 | Castellanos Zamora et al. | |
| 2020/0059989 A1* | 2/2020 | Velev | H04W 8/08 |
| 2020/0275302 A1 | 8/2020 | Youn et al. | |

FOREIGN PATENT DOCUMENTS

| | | |
|---|---|---|
| KR | 10-2016-0086353 A | 7/2016 |
| KR | 10-2016-0131092 A | 11/2016 |
| WO | 2019/073070 A1 | 4/2019 |

OTHER PUBLICATIONS

Huawei et al., 'TS 23.501: interaction between the AMF and SMF when the UE enters CM-IDLE state', S2-171040, 3GPP TSG SA WG2 Meeting #119, Feb. 13-17, 2017, Dubrovnik, Croatia.

ITRI, 'Interaction between AMF and NRF for handling of NSSAI', S2-171196, 3GPP TSG SA WG2 Meeting #119, Jan. 13-17, 2017, Dubrovnik, Croatia.

China Mobile, 'Describe NF service provided by AMF', S2-170906, 3GPP TSG SA WG2 Meeting #119, Feb. 13-17, 2017, Dubrovnik, Croatia.

Kim et al., 5G Mobility Management Technology, OSIA S&TR Journal, vol. 29, No. 4, Dec. 22, 2016.

"3rd Generation Partnership Project, Technical Specification Group Services and System Aspects, System Architecture for the 5G System, Stage 2 (Release 15)", 3GPP Standard, Technical Specification, 3GPP TS23.501, 3rd Generation Partnership Project (3GPP), Mobile Competence Centre, 650, Route Des Lucioles, F-06921 Sophia-Antipolis Cedex, France, vol. SA WG2, No. V0.3.1, Mar. 6, 2017, pp. 1-97, XP051290363.

European Search Report dated Dec. 19, 2019, issued in European Patent Application No. 18764214.5.

Sumsung, 'TS 23.501: Keep MICO mode UE in connected', 3GPP, S2-171881, SA WG2 Meeting #120, Mar. 27-31, 2017, Busan, S. Korea.

Qualcomm Incorporated et al., 'TS 23.501: MO only and registration area', 3GPP, S2-171554, SA WG2 Meeting #119, Feb. 13-17, 2017, Dubrovnik, Croatia.

Korean Decision to Grant a Patent dated Aug. 11, 2021, issued in Korean Patent Application No. 10-2017-0090961.

Extended European Search Report dated Jun. 10, 2022, issued in European Patent Application No. 22157920.4.

\* cited by examiner

METHOD FOR KEEPING MOBILE INITIATED CONNECTION ONLY MODE USER EQUIPMENT IN CONNECTED MODE

CROSS-REFERENCE TO RELATED APPLICATION(S)

This application is a continuation application of prior application Ser. No. 16/492,354, filed on Sep. 9, 2019, which is a U.S. National Stage application under 35 U.S.C. § 371 of an International application number PCT/KR2018/002749, filed on Mar. 8, 2018, which is based on and claims priority of a Korean patent application number 10-2017-0030561, filed on Mar. 10, 2017, in the Korean Intellectual Property Office, of a Korean patent application number 10-2017-0056430, filed on May 2, 2017, in the Korean Intellectual Property Office, and of a Korean patent application number 10-2017-0090961, filed on Jul. 18, 2017, in the Korean Intellectual Property Office, the disclosure of each of which is incorporated by reference herein in its entirety.

TECHNICAL FIELD

In the detailed description of embodiments of the disclosure, a radio access network will be mainly discussed on the basis of the 5G network standard defined by 3GPP, including a new RAN (NR) corresponding to a core network, and a packet core (5G system, 5G core network, or NG core (next-generation core)), but the main subject of the disclosure can be applied with a slight change to other communication systems having a similar technical background within the range that does not depart from the scope of the disclosure by the determination of a person skilled in the art.

For the convenience of description, the disclosure uses terms and names defined in the $3^{rd}$-generation partnership project long-term evolution (3GPP LTE). However, the disclosure is not limited to the terms and names, and may be equally applied to a system following another standard.

A UE according to an embodiment of the disclosure may be specialized as an Internet of Things (IoT) UE and may be useful as a UE having a function of communication with low power.

BACKGROUND ART

In order to meet wireless data traffic demands, which have increased since the commercialization of a 4G communication system, efforts to develop an improved 5G communication system or a pre-5G communication system have been made. For this reason, the 5G communication system or the pre-5G communication system is called a beyond-4G-network communication system or a post-LTE system. In order to achieve a high data transmission rate, implementation of the 5G communication system in a mmWave band (for example, a 60 GHz band) is being considered. In the 5G communication system, technologies such as beamforming, massive MIMO, full-dimensional MIMO (FD-MIMO), array antenna, analog beamforming, and large-scale antenna techniques are being discussed as means to mitigate a propagation path loss in the mmWave band and increase a propagation transmission distance. Further, for use in the 5G communication system, technologies such as an evolved small cell, an advanced small cell, a cloud Radio Access Network (RAN), an ultra-dense network, device-to-device communication (D2D), a wireless backhaul, a moving network, cooperative communication, Coordinated Multi-Points (CoMP), and received interference cancellation have been developed to improve the system network. In addition, for use in the 5G system, advanced coding modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) have been developed.

Meanwhile, the Internet has evolved from a human-oriented connection network in which humans generate and consume information to the Internet of Things (IoT), in which distributed components such as objects exchange and process information. Internet-of-everything (IoE) technology, in which a big-data processing technology is combined with the IoT technology through connection via a cloud server or the like, has emerged. In order to implement the IoT, technical factors such as a sensing technique, wired/wireless communication, network infrastructure, service-interface technology, and security technology are required, and research on technologies such as a sensor network, machine-to-machine (M2M) communication, machine-type communication (MTC), and the like for connection between objects has recently been conducted. In an IoT environment, through collection and analysis of data generated in connected objects, intelligent Internet technology (IT) service that creates new value in peoples' lives may be provided. The IoT may be applied to fields such as those of a smart home, a smart building, a smart city, a smart car, a connected car, a smart grid, health care, a smart home appliance, or high-tech medical services through the convergence of the conventional Information technology (IT) and various industries.

Accordingly, various attempts to apply 5G communication to the IoT network are being made. For example, 5G communication technologies such as a sensor network, machine-to-machine (M2M) communication, and machine-type communication (MTC) are being implemented using beamforming, MIMO, and array antenna schemes. The application of a cloud RAN as big-data processing technology may be an example of convergence of the 5G technology and the IoT technology.

DETAILED DESCRIPTION OF THE INVENTION

Technical Problem

MICO is the abbreviation for "mobile initiated communication only", and a MICO-mode UE is a UE having a connection with a network only when the UE has data to be transmitted. In other words, if the MICO-mode UE is in an idle state, the MICO-mode UE does not receive paging. Accordingly, the network cannot wake up the MICO-mode UE in the idle state and may determine that the corresponding UE is reachable only when the MICO-mode UE wakes up and makes a request for connection to the network. For example, if an SMS server is congested, a time delay may occur when a response SMS is transmitted in response to an SMS message transmitted by the UE. If the UE returns to the idle mode during the delay time, the network cannot wake up the MICO-mode UE to transmit the response SMS.

Accordingly, the disclosure provides a method of preventing the MICO-mode UE from entering the idle mode so as to remain in the connected mode in the event where response traffic is somewhat delayed depending on the type of application or the type of service after the MICO-mode UE establishes the connection and transmits data. Further, the disclosure broadly provides a method by which, if an application server desires to transmit planned traffic at a specific time, the network may control the MICO-mode UE to remain in the connected mode until the corresponding time.

A mobility restriction area is a set of area information including an allowed area in which a session is capable of being established according to the location of the UE and thus data can be exchanged, a non-allowed area in which a session for data communication cannot be established but only control signaling is possible, and a forbidden area in which no mobile communication services are possible.

Accordingly, the disclosure proposes an operation of paging the UE when the UE is in a non-allowed area and a method of processing a session management message that the UE transmits along with a registration request when allocating and managing the mobility restriction area for controlling service according to movement of the UE. A 5G network should be able to determine when to page the UE in the non-allowed area. Further, if the UE transmits a message for establishing a session to the AMF in the state in which the UE is not aware that the UE is present in the non-allowed area, the AMF should be able to determine how to process the message. Through the disclosure, it is not possible for the UE to use the session in the non-allowed area, but the session may be established in advance within the network and may be activated when the UE moves to an allowed area.

Solution to Problem

In accordance with an aspect of the disclosure, a method of performing communication by a base station in a wireless communication system is provided. The method includes: receiving, from an access and mobility management function (AMF), a first message including information for maintaining a mobile initiated communication only (MICO)mode terminal in a connected state; determining whether to release the connection of the MICO mode terminal based on the information; and in case that it is determined to release the connection of the MICO mode terminal, transmitting, to the AMF, a second message making a request for releasing the connection.

The determining of whether to release the connection may include: configuring a timer for a connection maintenance time of the MICO mode terminal based on the information; and in case that the timer expires, determining to release the connection of the MICO mode terminal.

The information may include at least one piece of information indicating that the UE is using a MICO mode and information on the time for which the UE should maintain the connected state in the MICO mode.

The determining of whether to release the connection may include configuring a larger value between a radio resource control (RRC) inactive timer and the time for which the UE should maintain the connected state in the MICO mode as a timer for a connection maintenance time of the MICO mode terminal and determining whether the timer expires.

The first message may be a message for installing context of the UE in the base station or establishing a data radio bearer.

The method may further include releasing radio resources and a bearer according to a determination to accept the release of the connection of the MICO mode terminal by the AMF.

In accordance with another aspect of the disclosure, a method of performing communication by an access and mobility management function (AMF) is provided. The method includes: transmitting a first message including information for maintaining a mobile initiated communication only (MICO)mode terminal in a connected state to a base station; and in case that it is determined to release the connection of the MICO mode terminal based on the information, receiving a second message making a request for releasing the connection from the base station.

The receiving of the second message may include, in case that a timer for a connection maintenance time of the MICO mode terminal configured based on the information expires, receiving the second message making the request for releasing the connection from the base station.

The method may further include: determining whether to accept the release of the connection of the MICO mode terminal; and in case that it is determined to accept the release of the connection of the MICO mode terminal, transmitting a third message accepting the release of the connection of the MICO mode terminal to the base station.

The method may further include: receiving information on a communication pattern of the MICO mode terminal from an application server; and configuring information for maintaining the MICO mode terminal in the connected state on the basis of the information on the communication pattern of the MICO mode terminal.

In accordance with another aspect of the disclosure, a base station is provided. The base station comprises: a transceiver configured to transmit and receive a signal; and a controller configured to receive a first message including information for maintaining a mobile initiated communication only (MICO)mode terminal in a connected state from an access and mobility management function (AMF), determine whether to release the connection of the MICO mode terminal based on the information, and in case that it is determined to release the connection of the MICO mode terminal, transmit a second message making a request for releasing the connection to the AMF.

In accordance with another aspect of the disclosure, an access and mobility management function (AMF) is provided. The AMF comprises: a transceiver configured to transmit and receive a signal; and a controller configured to transmit a first message including information for maintaining a mobile initiated communication only (MICO)mode terminal in a connected state to a base station, and in case that it is determined to release the connection of the MICO mode terminal based on the information, receive a second message making a request for releasing the connection from the base station.

Advantageous Effects of Invention

According to an embodiment of the disclosure, a mobile communication service provider can effectively support a UE having delayed traffic transmission for each service used by the UE or according to a request from an application server that provides a service to the UE. The MICO-mode UE is suitable for a UE requiring low-power communication, and as a result, is connected to a network and communicates only when the UE has data to be transmitted. However, when the corresponding UE transmits response traffic in response to traffic transmitted by the UE, somewhat delayed traffic transmission may occur according to a service or a state of the application server. For example, if an SMS server is congested, a time delay may occur when a response SMS is transmitted in response to an SMS message that the UE transmitted. If the UE returns to the idle mode during the delay time, the network cannot wake up the MICO mode terminal to transmit the response SMS thereto. Accordingly, the present embodiment provides an effect in that a data communication service can be provided without loss of traffic transmitted to the UE since the network can maintain the MICO mode terminal in the connected state for a specific time with respect to a service or traffic expected to be delayed.

According to an embodiment of the disclosure, when the 5G network performs paging in the non-allowed area, the UE can determine a service to be used as a response thereto. Through the disclosure, after making a request for a PDU session in the non-allowed area, the UE can activate and use the corresponding session when moving to the allowed area. It takes a shorter time than the case in which the UE enters the allowed area and makes a request for establishing a PDU session again to use the same, and less signaling is generated from the viewpoint of the network.

According to an embodiment of the disclosure, the 5G core network may determine to page the UE to use a specific service, for example, an emergency call, an SMS service, a location-tracking service, or a public safety service even though the UE is in the non-allowed area. Further, the network side establishes the session and configures a context in advance in response to a PDU session establishment request message sent by the UE in the non-allowed area, so that it is possible to reduce a PDU session establishment time of the UE and signaling when the UE moves to the allowed area and uses the PDU session.

MODE FOR CARRYING OUT THE INVENTION

Figure 1:
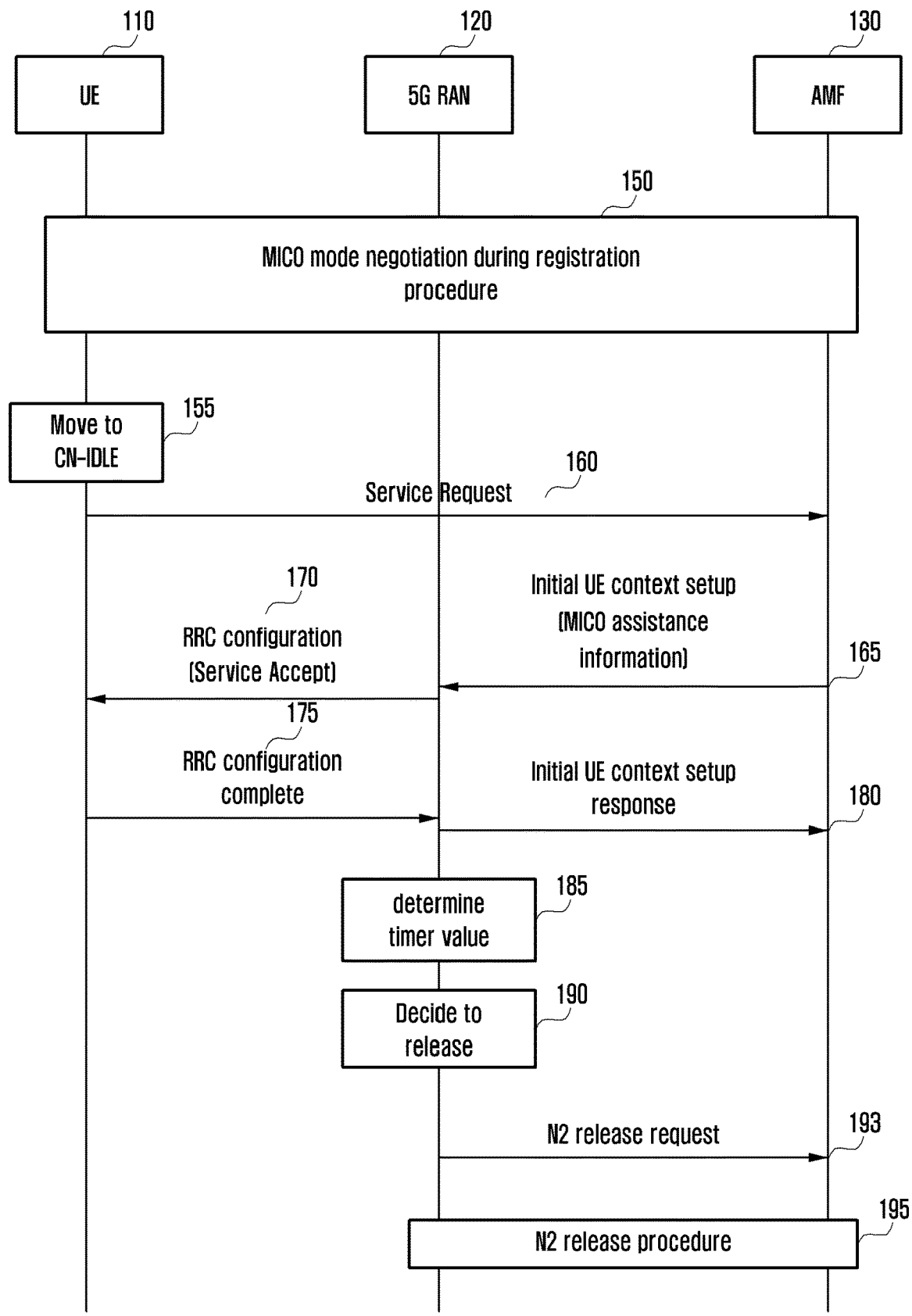
FIG. 1 illustrates a procedure in which a 5G core network transmits information for maintaining a MICO mode terminal in a connected state to a RAN.

In a description of embodiments of the disclosure, a description of technologies that are already known to those skilled in the art and are not directly relevant to the disclosure is omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, the '— unit' may include one or more processors.

Embodiment 1

In the detailed description of embodiments of the disclosure, a radio access network will be mainly discussed on the basis of the 5G network standard defined by 3GPP, including a new RAN (NR) corresponding to a core network, and a packet core (5G system, 5G core network, or NG core (next-generation core)), but the main subject of the disclosure can be applied with a slight change to other communication systems having a similar technical background within the range that does not depart from the scope of the disclosure by the determination of a person skilled in the art.

For the convenience of description, the disclosure uses terms and names defined in the 3rd-generation partnership project long-term evolution (3GPP LTE). However, the disclosure is not limited to the terms and names, and may be equally applied to a system following another standard.

Entities in the disclosure will be described below.

A user equipment (UE) is connected to a radio access network (RAN) and accesses a device that performs a mobility management function of a 5G core network device. In the disclosure, the device is called an access and mobility management function (AMF). This refers to a function or a device that performs both access to the RAN and mobility management. The AMF serves to route a session-related message of the UE to a session management function (SMF). The AMF is connected to the SMF, and the SMF is connected to a user plane function (UPF), allocate user plane resources to be provided to the UE, and establishes a tunnel for transmitting data between a base station and the UPF.

MICO is an abbreviation for "mobile initiated communication only", and a MICO-mode UE is a UE having a connection with a network only when the UE has data to be transmitted. In other words, if the MICO-mode UE is in an idle state, the MICO-mode UE does not receive paging. Accordingly, the network cannot wake up the MICO-mode UE in the idle state, and may determine that the corresponding UE is reachable only when the MICO-mode UE wakes up and makes a request for connection to the network. For example, if an SMS server is congested, a time delay may occur when the network transmits a response SMS in response to an SMS message that the UE transmitted. If the UE returns to the idle mode during the delay time, the network cannot wake up the MICO-mode UE to transmit the response SMS. In another example, if there is a characteristic of tolerating a long delay time (delay tolerance), which is one of the characteristics of IoT traffic, an IoT UE using a MICO mode transmits traffic, and if the UE returns to the idle mode while waiting for a response thereto, delayed response traffic, which an application server transmits, cannot be transmitted to the UE. Accordingly, the disclosure proposes a method of providing an appropriate data traffic service by maintaining the MICO-mode UE in a connected state for a predetermined time in a 5G core network. In another example, the application server may set a communication pattern of a specific UE through a network exposure function (NEF). For example, a service provided to a specific UE may have a delayed communication characteristic, or the time for which the specific UE performs data communication and the time taken for data communication to be performed once may be transmitted to the 5G core network. After receiving the information, the AMF may use the information to maintain the connected state of the MICO-mode UE. If the time at which the UE wakes up is close to the time at which the UE should perform data communication, the AMF may maintain the UE in the connected state. If the UE wakes up and receives a value indicating data communication for 1 minute, the corresponding UE may be maintained in the connected state for 1 minute.

The disclosure describes data transmission by way of example, but a service such as an SMS may be included as one example of data transmission. Alternatively, a service of transmitting and receiving data may be included in order to detect location information of the UE.

Embodiment 1-1 and FIG. 1

FIG. 1 illustrates a procedure in which a 5G core network transmits information for maintaining a MICO-mode UE in a connected state to a RAN.

In step 150, a UE 110 and an AMF 130 negotiate about whether to use a MICO mode during a registration procedure. The UE 110 may make a request for the MICO mode to the AMF 130 and may operate in the MICO mode only when the AMF 130 allows the UE 110 to operate in the MICO mode.

The UE 110, which is allowed to operate in the MICO mode, enters the idle state after a predetermined time in step 155. In this state, the UE 110 does not monitor a paging channel, and accordingly does not perform a paging operation.

If the MICO-mode UE 110 has data to be transmitted, the UE 110 informs a NAS layer of the UE 110 that data communication is needed, and the NAS layer configures a service request message. In step 160, the UE 110 transmits the service request message to the AMF 130 to activate a PDU session required for data communication. The disclosure assumes that the UE 110 performed a PDU session establishment procedure before this step.

The AMF 130 determines that the received service request arrives from the MICO-mode UE 110 and then transmits a request for a procedure for activating a PDU session to the SMF (not shown). After receiving a PDU session activation response from the SMF (not shown), the AMF 130 transmits a message for establishing a data radio bearer to a base station 120 in step 165. In the disclosure, the message is called an initial UE context setup, which corresponds to a message that the AMF 130 transmits to the RAN node 120 in order to make a path for data transmission to the UE 110. According to an embodiment of the disclosure, the AMF 130 may insert information for assisting MICO-mode operation of the UE 110 into the message. The information may include the following information.

Indication indicating that the UE 110 is using the MICO mode

The time for which the UE 110 should maintain the connected state in the MICO mode The 5G RAN 120 receiving the message establishes a DRB with the UE 110 through an RRC procedure in steps 170 and 175.

After succeeding in establishing the DRB, the 5G RAN 120 transmits a response to an initial UE context setup message to the AMF 130 in step 180. The response may include an indication of the listed information (an indication indicating that the MICO mode is being used and the time for which the connected state should be maintained) is applied.

According to an embodiment of the disclosure, the 5G RAN 120 may set a timer value for determining an inactive state of the RRC on the basis of the received information on the time for which the UE 110 should maintain the connected state in the MICO mode in step 185. The 5G RAN 120 internally sets an RRS inactive timer for determining RRC connection inactivation of the UE 110. This may be used to determine that the RRC connection is inactivated if there is no RRC operation of the UE 110 for a predetermined time, and after the timer expires, the 5G RAN 120 performs an operation of releasing the radio resources allocated to the UE 110 and releasing the bearer. According to an embodiment of the disclosure, the 5G RAN 120 may configure a larger value among the set RRC inactive timer and the received "time for which the UE 110 should maintain the connected state in the MICO mode" (hereinafter, referred to as a MICO timer) as an RRC inactivity timer (that is, MAX{RRC inactive timer, MICO timer}). According to another embodiment of the disclosure, the 5G RAN 120 may configure the received MICO timer as the RRC inactivity timer.

The 5G RAN 120 starts the configured timer from a time point at which the RRC operation of the UE 110 is not performed, and if the timer expires, determines to release an RRC connection with the UE 110 and an N2 connection with the AMF 130 (the name of the interface between the 5G RAN 120 and the AMF 130 is N2) in step 190.

The 5G RAN 120 determining to release the connections transmits an N2 release request to the AMF 130 in step 193, and the AMF 130 performs a release procedure in step 195.

Figure 2:
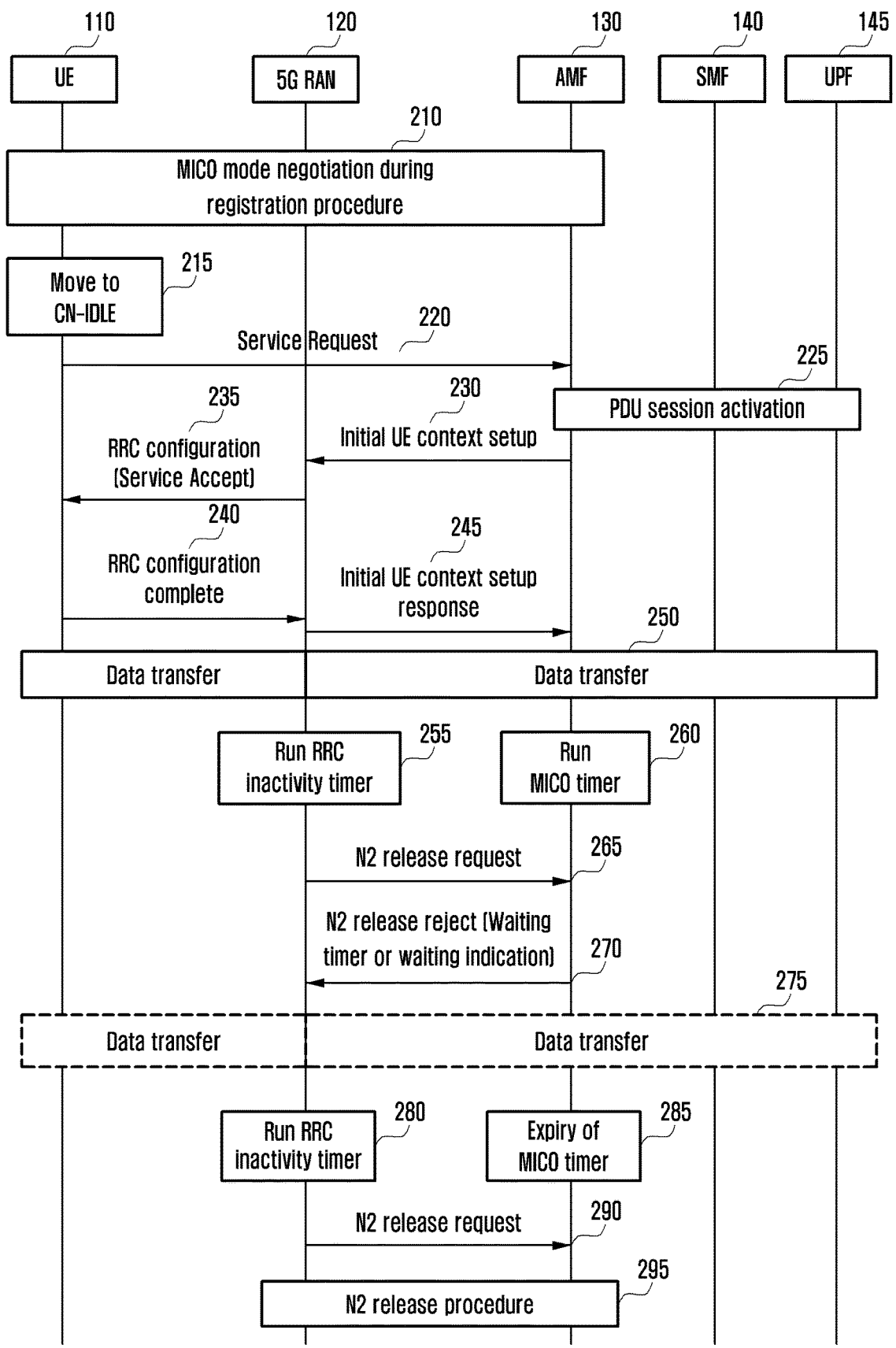
FIG. 2 illustrates a method by which a 5G core network stores information for maintaining a MICO mode terminal in a connected state and controls the release of a RAN connection.

Embodiment 1-2 and FIG. 2

FIG. 2 illustrates a method by which a 5G core network stores information for maintaining a MICO-mode UE in a connected state and controls the release of a RAN connection.

In step 210, a UE 110 and an AMF 130 negotiate about whether to use a MICO mode during a registration procedure. The UE 110 may make a request for the MICO mode to the AMF 130 and may operate in the MICO mode only when the AMF 130 allows the UE 110 to operate in the MICO mode.

The UE 110, which is allowed to operate in the MICO mode, enters the idle state after a predetermined time in step 215. In this state, the UE 110 does not monitor a paging channel, and accordingly does not perform a paging operation.

If the MICO-mode UE 110 has data to be transmitted, the UE 110 informs a NAS layer of the UE 110 that data communication is needed, and the NAS layer configures a service request message. The disclosure assumes that the UE 110 performed a PDU session establishment procedure before this step. In step 220, the UE 110 transmits the service request message to the AMF 130 to activate a PDU session, which is required for data communication.

The AMF 130 determines that the received service request arrives from the MICO-mode UE 110 and then transmits a request for a procedure for activating a PDU session to the SMF 140 in step 225. After receiving a PDU session activation response from the SMF 140, the AMF 130 transmits a message for establishing a data radio bearer to a base station 120 in step 230. In the disclosure, the message is called an initial UE context setup, which corresponds to a message that the AMF 130 transmits to the RAN node 120 in order to make a path for data transmission to the UE 110.

The 5G RAN 120 receiving the message establishes a data radio bearer (DRB) with the UE 110 through an RRC procedure in steps 235 and 240.

After succeeding in establishing the DRB, the 5G RAN 120 transmits a response to an initial UE context setup message to the AMF 130 in step 245.

Thereafter, the UE 110 may start data communication in step 250.

According to an embodiment of the disclosure, the AMF 130 stores the time for which the UE 110 should maintain the connected state in the MICO mode in the form of a context for the MICO-mode UE 110. The information may be a value according to an internal policy of the AMF 130, a value set for a data network name (DNN) used by the UE 110, or a value according to a communication pattern indicating the time for which the corresponding UE 110 performs data communication or at which the data communication is needed, which is configured by a 3rd-party application server. In step 260, the AMF 130 knows that the UE 110 is using the MICO mode, and accordingly, drives a timer (hereinafter, referred to as a MICO timer) for configuring the time for which the UE 130 should maintain the connected state in the MICO mode.

If no RRC operation of the UE 110 is detected, the 5G RAN 120 drives the internally configured RRC inactivity timer in step 255. If no RRC operation of the UE 110 is detected when the RRC inactivity timer expires, the 5G RAN 120 determines to release the RRC connection of the UE 110 and transmits an N2 release request to the AMF 130 in step 265.

The AMF 130 receiving the message identifies whether the MICO timer is driven according to an embodiment of the disclosure. If the MICO timer does not expire, the AMF 130 rejects the N2 release request transmitted by the 5G RAN 120 in step 270. According to an additional embodiment, the AMF 130 may insert the remaining time of the MICO timer or a time value indicating how long the RAN 120 should wait into the rejection message of the N2 release request or may provide an indication indicating that the connection should be further maintained for the reason of rejection.

In step 275, the UE 110 having the non-released connection may additionally perform data transmission. If no RRC operation of the UE is detected, the RAN 120 drives the RRC inactivity timer in step 280, and if the RRC inactivity timer expires, transmits an N2 release request to the AMF 130 in step 290.

The AMF 130 receiving the message determines whether the MICO timer for the corresponding UE expires in step 285. If the MICO timer expires, the AMF 130 performs an N2 release procedure in step 295.

Figure 3:
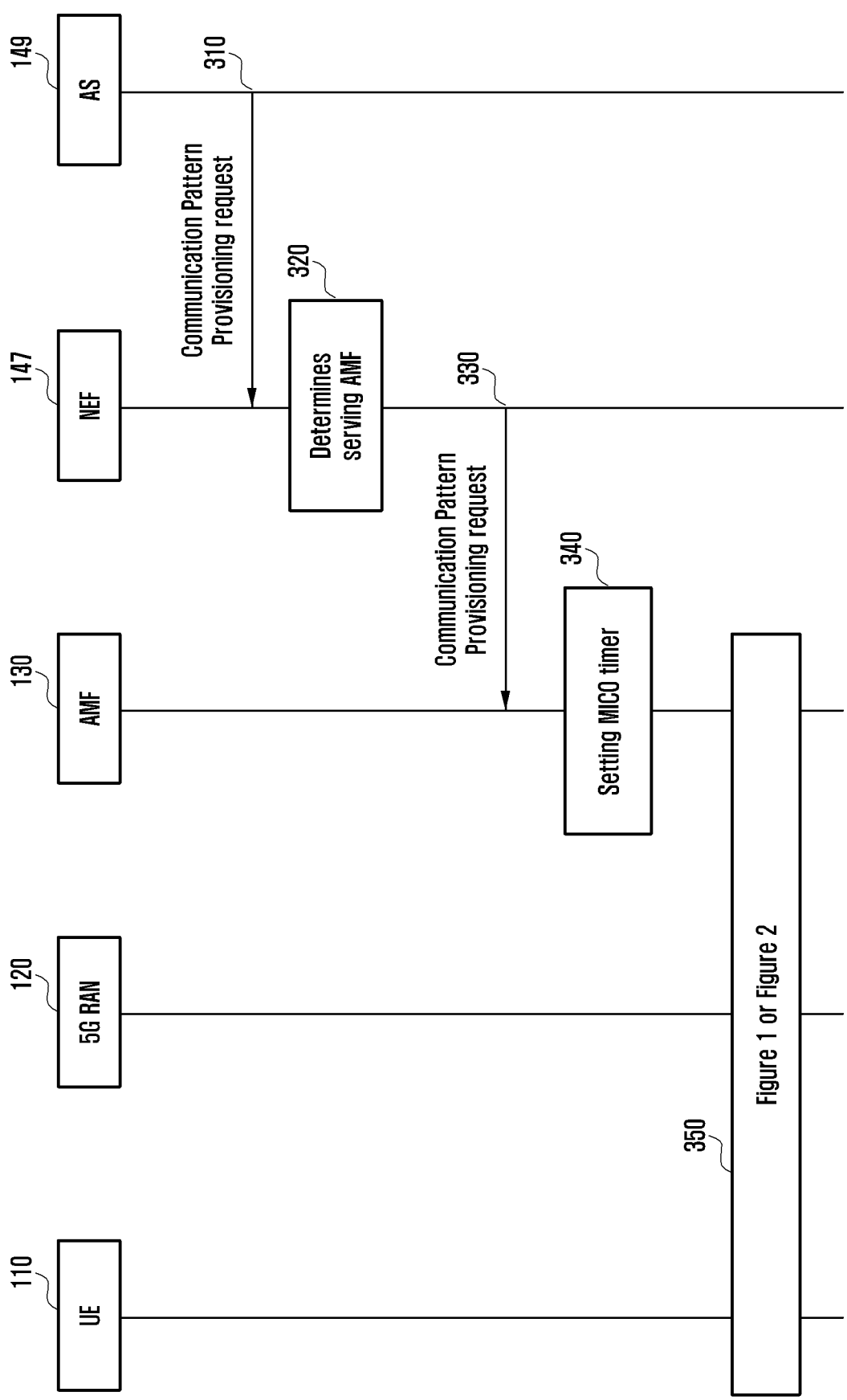
FIG. 3 illustrates a method by which a 5G core network receives a communication pattern for a corresponding UE from a 3rd-party application server through an NEF and controls a MICO timer.

Embodiment 1-3 and FIG. 3

FIG. 3 illustrates a method by which a 5G core network receives a communication pattern for a corresponding UE from a 3rd-party application server through an NEF and controls a MICO timer.

An application server 149 operated by the 3rd party may configure a communication pattern of the corresponding UE 110, to which the application server provides a service, in a 5G network according to the characteristics of the service. The communication pattern may include the following information.

Communication schedule of the UE 110: for example, Monday, 9:10 or 11:11 on November 11

Communication duration of the UE 110: Time for which the connection is maintained if the UE initiates communication such as 1 minute or 5 minutes Communication delay of the UE 110: Traffic delay applied when the AS provides a service to the UE, for example, 1 s or 800 ms In step 310, the 3rd-party application server 149 transmits a request for configuring the communication pattern for the specific UE 110 through a network exposure function (NEF) 147. The request message includes an identifier of the UE 110. In addition, the request message may include a DNN value, which is used when the UE 110 communicates with the application server 149.

The NEF 147 receiving the request finds the requested AMF 130 serving the UE 110 in step 320. Thereafter, according to an embodiment of the disclosure, the NEF 147 transmits the requested communication pattern to the AMF 130 serving the corresponding UE 110 in step 330. In the disclosure, this is called a communication pattern provisioning request for convenience. According to an additional embodiment, the message is not directly transmitted from the NEF 147 to the AMF 130, but the NEF 147 may configure information of the UE 110 in user data management (UDM) (serving as an HSS in the past) and then the UDM may inform the AMF 130 of a context update of the UE 110, so that the communication pattern may be transmitted to the AMF 130.

After receiving the communication pattern information, the AMF 130 configures a MICO timer value for the UE 110 using the MICO mode in step 340. Thereafter, the procedures illustrated in FIGS. 1 and 2 are performed in step 350.

Figure 4:
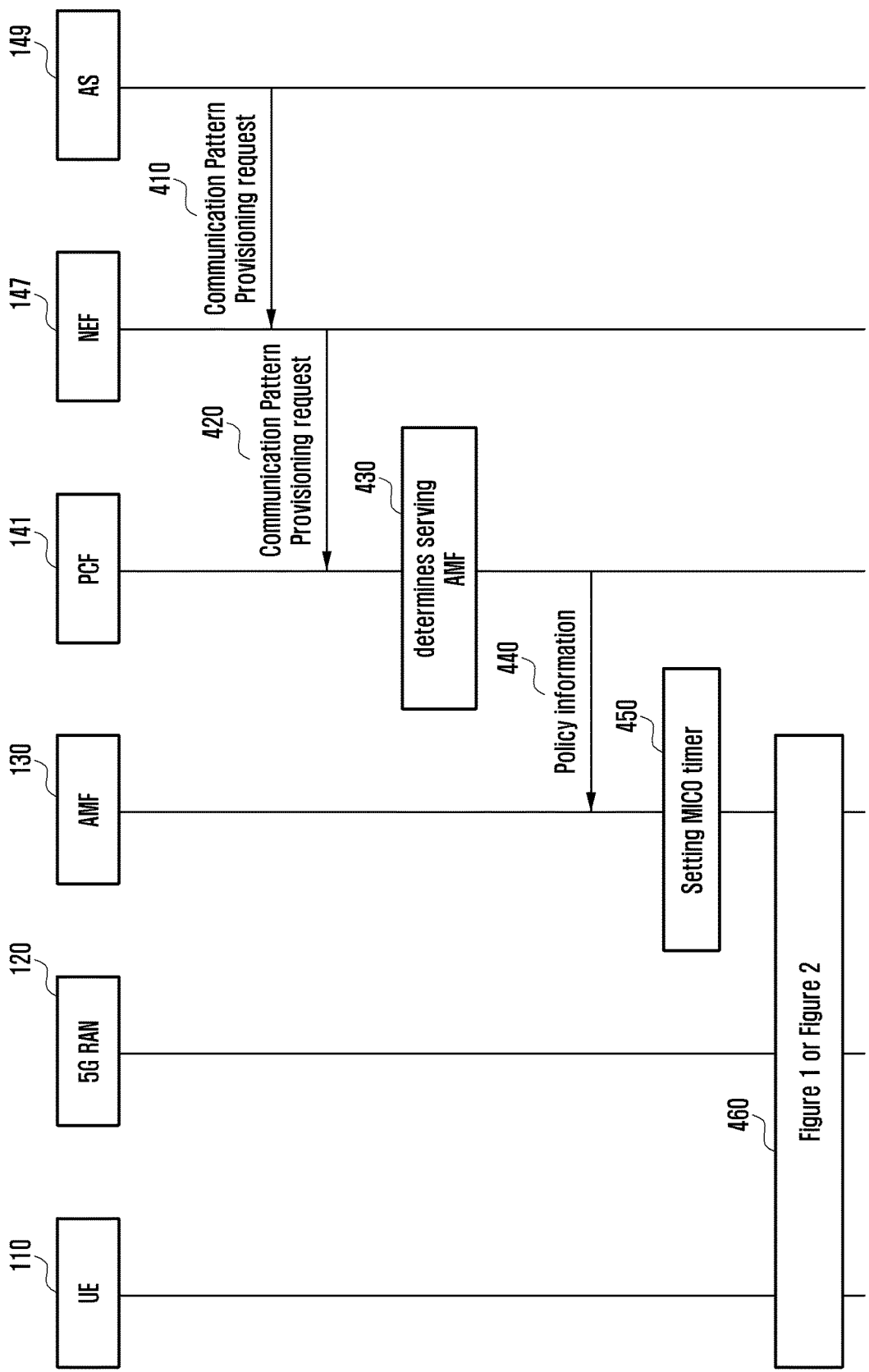
FIG. 4 illustrates a method by which a 5G core network receives a communication pattern for a corresponding UE from a 3rd-party application server through a PCF and controls a MICO timer.

Embodiment 1-4 and FIG. 4

FIG. 4 illustrates a method by which a 5G core network receives a communication pattern for a corresponding UE from a 3rd-party application server through a PCF and controls a MICO timer.

An application server 149 operated by the 3rd party may configure a communication pattern of the corresponding UE 110, to which the application server provides a service, in a 5G network according to the characteristics of the service. The communication pattern may include the following information.

Communication schedule of the UE 110: for example, Monday, 9:10 or 11:11 on November 11

Communication duration of the UE 110: Time for which the connection is maintained if the UE initiates communication, such as 1 minute or 5 minutes Communication delay of the UE 110: Traffic delay applied when the AS provides a service to the UE, for example, 1 s or 800 ms.

In step 410, the 3rd-party application server 149 transmits a request for configuring the communication pattern for the specific UE 110 through a network exposure function (NEF) 147. The request message includes an identifier of the UE 110. In addition, the request message may include a DNN value, which is used when the UE 110 communicates with the application server 149.

The NEF 147 receiving the request transmits both the requested identifier of the UE 110 and the request to the PCF 141 in step 420. After authenticating the request, the PCF 141 finds the AMF 130 serving the corresponding UE 110 in step 430. Thereafter, according to an embodiment of the disclosure, the PCF 141 transmits the requested communication pattern to the AMF 130 serving the corresponding UE 110 in step 440. This may be included in policy information that the PCF 141 transmits to the AMF 130.

After receiving the communication pattern information, the AMF 130 configures a MICO timer vale for the UE 110 using the MICO mode in step 450. Thereafter, the procedures illustrated in FIGS. 1 and 2 are performed in step 460.

Embodiment 2

In the detailed description of embodiments of the disclosure, a radio access network will be mainly discussed on the basis of the 5G network standard defined by 3GPP, including a new RAN (NR) corresponding to a core network, and a packet core (5G system, 5G core network, or NG core (next-generation core)), but the main subject of the disclosure can be applied with a slight change to other communication systems having a similar technical background within the range that does not depart from the scope of the disclosure by the determination of a person skilled in the art.

For the convenience of description, the disclosure uses terms and names defined in the 3rd-generation partnership project long-term evolution (3GPP LTE). However, the disclosure is not limited to the terms and names, and may be equally applied to a system following another standard.

Entities in the disclosure will be described below.

A user equipment (UE) is connected to a radio access network (RAN) and accesses a device that performs a mobility management function of a 5G core network device. In the disclosure, the device is called an access and mobility management function (AMF). This refers to a function or a device that performs both access to the RAN and mobility management. The AMF serves to forward a session-related message of the UE to a session management function (SMF). The AMF is connected to the SMF, and the SMF is connected to a user plane function (UPF), allocate user plane resources to be provided to the UE, and establishes a tunnel for transmitting data between a base station and the UPF. In the disclosure, the AMF may refer to a core network device providing mobility management of the UE, that is, a device having another name that receives a NAS message of the UE. For convenience, the device is called an access mobility management function (AMF) in the disclosure.

4G is $4^{th}$-generation mobile communication and includes radio access network technology called LTE and core network technology called evolved packet core (EPC). 5G is $5^{th}$-generation mobile communication. Radio access network technology of 5G is called a next-generation RAN (NG-RAN), and core network technology is called a 5G system core.

A mobility restriction area is a set of area information including an allowed area in which a session is allowed to be established according to the location of the UE and thus data can be exchanged, a non-allowed area in which a session for data communication cannot be established but only control signaling is possible, and a forbidden area in which no mobile communication services are possible.

Figure 5:
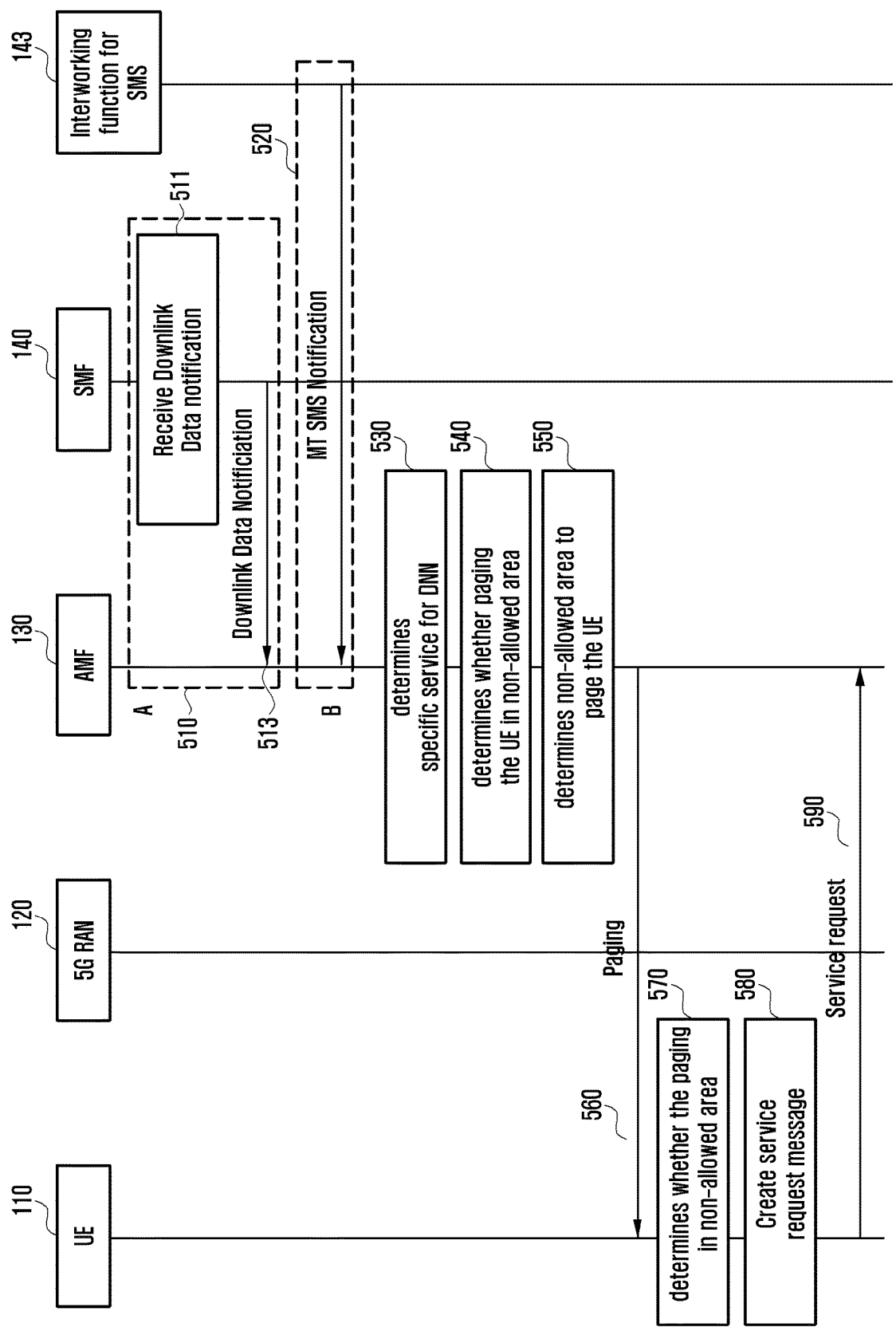
FIG. 5 illustrates a procedure in which a 5G core network performs a determination to provide a specific service to a UE in a non-allowed area, a paging method, and a response method of the UE.

Embodiment 2-1 and FIG. 5

Figure 7:
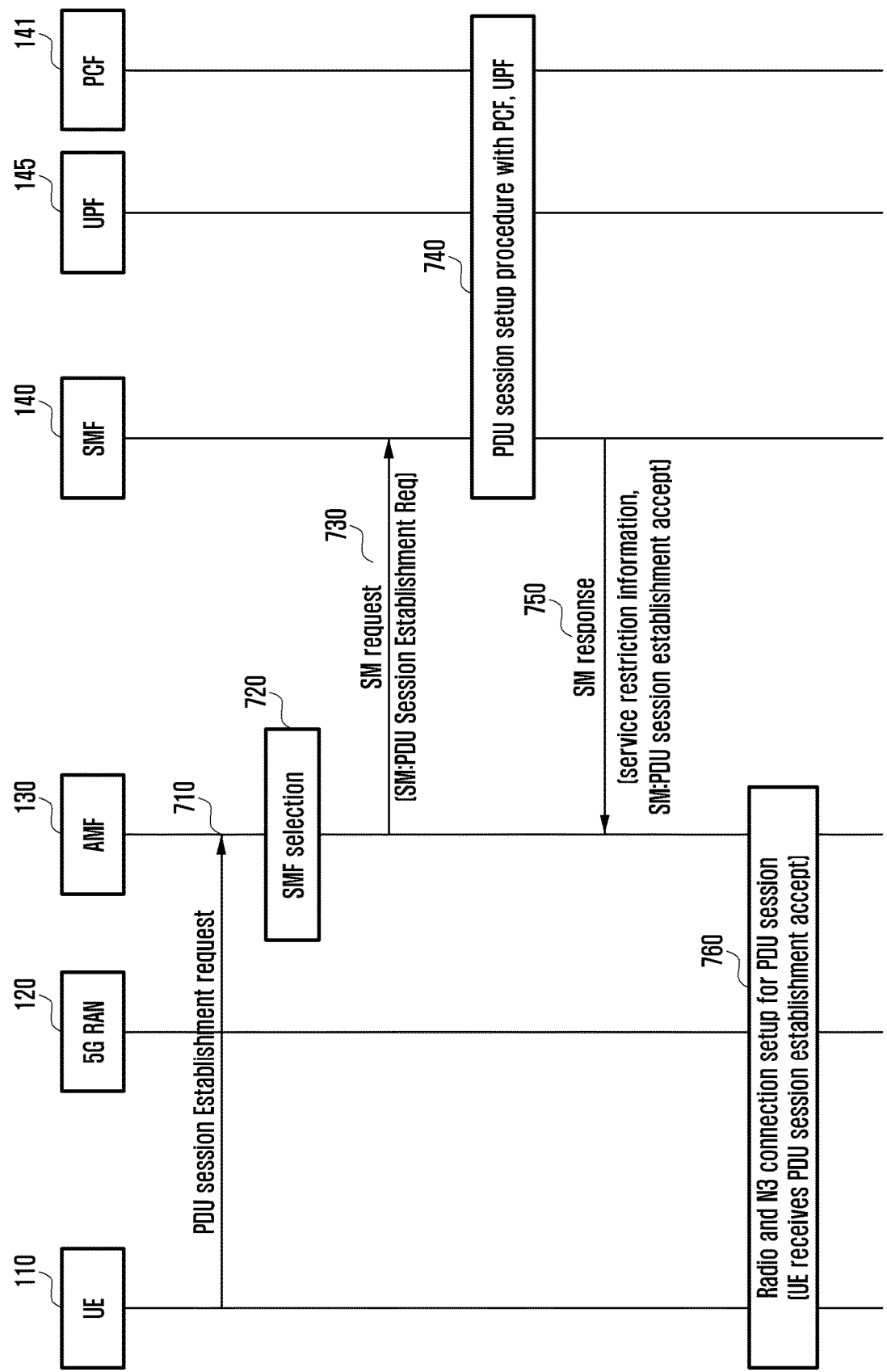
FIG. 7 illustrates a method of establishing a connection for a PDU session between a UE, a 5G RAN, and a UPF according to an embodiment of the disclosure.

FIG. 5 illustrates a procedure in which a 5G core network performs a determination to provide a specific service to a UE in a non-allowed area, a paging method, and a response method of the UE, and FIG. 7 illustrates a method by which a connection for a PDU session between the UE, a 5G RAN, and a UPF is established according to an embodiment of the disclosure.

The 5G core network allocates mobility restriction area information to the UE 110. This may be included in subscriber information or a policy function 141. The information is transmitted to the AMF 130, which the UE 110 accesses, and the AMF 130 transmits the information to the UE 110 through a NAS procedure. Accordingly, the UE 110 and the AMF 130 have the same mobility restriction area information.

If the UE 110 moves from the allowed area to the non-allowed area, the UE 110 may inform the AMF 130 that the UE 110 has entered the non-allowed area through a registration update procedure. Accordingly, the AMF 130 may be made aware that the UE 110 is currently in the non-allowed area. Similarly, if the UE 110 moves from the non-allowed area to the allowed area, the UE 110 may inform the AMF 130 that the UE 110 has entered the allowed area through the registration update procedure and that the session can be used.

Referring to FIG. 7, the UE 110 configures a session management NAS message corresponding to a PDU session establishment request that makes a request for establishing a PDU session and transmits the session management NAS message to the AMF 130 in step 710. After receiving the message, the AMF 130 selects the SMF 140 capable of generating the corresponding PDU session in step 720 and then transmits the message received from the UE 110 to the SMF 140 in step 730. In step 740, the SMF 140 performs a PDU session establishment procedure with the UPF 145 and the PCF 141 according to a request for establishing the PDU session from the UE 110 in step 740. In step 750, the SMF 140 informs the AMF 130 of the PDU session establishment result. The message that the SMF 140 transmits to the AMF 130 includes the PDU session establishment message, which the SMF 140 transmits to the UE 110, in the form of a session management NAS message. According to an embodiment of the disclosure, the message includes information indicating whether the PDU session established in the UE 110 can override a service restriction. More specifically, the message may include an identifier indicating whether the PDU session established in the UE 110 can be used in the non-allowed area. The SMF 140 may acquire the information from the PCF 141. The PCF 141 may determine whether the corresponding PDU session can be used in the non-allowed area according to an operator policy and transmit the information to the SMF 140 when performing the PDU session establishment procedure with the SMF 140. According to a more detailed embodiment, the SMF 140 may indicate whether the PDU session can be used only in the allowed area or can be used both in the allowed area and in the non-allowed area through service restriction information indicating whether service restriction can be overridden. Alternatively, the SMF may indicate only one thereof. The information may be indicated by an ARP between a priority value or a QoS value. In another example, whether the PDU session can be used in the non-allowed area and the reason therefor may be provided. The reason may include whether the corresponding PDU session is for an emergency or public safety, whether the determination is by a local policy, or whether the PDU session is for an operator-specific service. The AMF 130 receiving the information stores a PDU session ID, which is the ID of a PDU session generated by the corresponding SMF 140 and service restriction override information thereof. According to another embodiment, if the AMF 130 stores information indicating that the corresponding PDU session can be used in the non-allowed area, the AMF 130 performs PDU session activation without rejection when receiving the service request message that the UE 110 transmits for the corresponding PDU session in the non-allowed area.

The AMF 130 transmits PDU session establishment accept, which is an SM NAS message received from the SMF 140, to the 5G RAN 120 in step 760, and accordingly the connection for the PDU session between the UE 110, the 5G RAN 120, and the UPF 145 is established. According to a detailed embodiment, the SMF 140 may insert information indicating whether the corresponding PDU session is a PDU session which can be used in the non-allowed area into the PDU session establishment accept message transmitted to the UE 110. After the UE 110 receives the message, if it is determined that the corresponding PDU session can be used in the non-allowed area, the UE 110 may transmit a service request for the corresponding PDU session after entering the non-allowed area in the future.

Referring to FIG. 5, it is assumed that the UE is in the non-allowed area in the present embodiment.

If data traffic from the UPF 145 to the UE 110 is generated, the SMF 140 receives information indicating that downlink data is generated in step 511. The SMF 140 receiving the information transmits a downlink data notification to the AMF 130 in order to wake up the UE 110 in step 513. The AMF 130 receiving the downlink data notification determines whether paging for the UE 110 is needed in step 510. In another example, when an SMS for the UE 110 arrives, the SMS interworking function 143 for providing an SMS service may provide a notification indicating arrival of the SMS to the AMF 130 or may directly transmit the SMS message to the AMF 130. The AMF 130 receiving the downlink data notification determines whether paging for the UE 110 is needed in step 520. In addition to the two examples, the AMF 130 also determines whether paging for the UE 110 is needed when another network service (for example, a location-tracking service) makes a request to wake up the UE 110.

According to an embodiment of the disclosure, if the AMF 130 receives a request for paging of the UE 110, such as a downlink data notification message, the AMF 130 determines whether the UE 110 is currently in the non-allowed area. The AMF 130, having determined that the UE 110 is in the non-allowed area, determines whether to page the UE 110 according to the following determination reference in step 540.

The AMF 130 identifies a data network name (DNN) for the received downlink data notification in step 530. After determining whether the DNN is a DNN for a voice DNN, a DNN for an emergency service, or a DNN for public safety, the AMF 130 determines whether to page the UE 110 in step 540.

The AMF 130 identifies whether the entity transmitting the SMS is a phone number for public safety, for example, 119 or 112, in response to the request for the received SMS message, and determines to page the UE 110 in step 540.

The AMF 130 identifies information on a network slice for the received downlink data notification. If the corresponding network slice is a network slice for emergency services, the AMF 130 determines to page the UE 110 in step 540. If the corresponding network slice is a network slice for public safety, the AMF 130 determines to page the UE 110.

If the received request is a request for tracking a location of the UE 110 or if the AMF 130 detects that the request is related to a location service that a service provider provides to the UE 110, the AMF 130 determines to page the UE 110 in step 540. The location service that the service provider provides to the UE 110 may be a service such as a service for finding a missing UE.

When performing a PDU session establishment procedure for the ID of the PDU session in which the downlink data notification is received with the corresponding SMF 140, the AMF 130 determines whether the corresponding PDU session can be paged in the non-allowed area on the basis of received service restriction override information. If the service restriction override information includes information indicating that service is allowed in the non-allowed area, the AMF 130 performs paging for the corresponding downlink data notification in step 540.

According to an embodiment of the disclosure, the AMF 130 determining the paging determines the non-allowed area in which the UE 110 is located in step 550. This may be a non-allowed area list which the AMF 130 allocates to the UE 110. Alternatively, this may be a non-allowed area list allocated to the UE 110 during the registration update procedure, performed when the UE 110 enters the non-allowed area. Alternatively, this may be the current location of the non-allowed area that the UE 110 provides during the registration update procedure, which is performed when the UE 110 enters the non-allowed area.

The AMF 130, determining the area to page the UE 110, transmits a paging message to the 5G RAN node 120 in the corresponding area in step 560.

The 5G RAN 120 transmits the paging message for the corresponding UE 110 to a cell managed by the 5G RAN according to the received paging request in step 560.

According to an embodiment of the disclosure, when receiving paging, the UE 110 determines whether the location is the non-allowed area in step 570. This may be identified on the basis of the non-allowed area list received from the AMF 130.

In step 580, the UE 110 may configure a service request message in response to paging (or configure the service request message by inserting an indication indicating that a session establishment procedure is needed into a registration update message). When configuring the service request message, the UE 110 may insert an ID of the PDU session to be used by the UE. According to an embodiment of the disclosure, the UE 110 performs the following operation.

If the location at which to page the UE 110 is included in the non-allowed area, the UE 110 does not insert the PDU session ID into the service request message. This may mean that the UE 110 follows a PDU session established by the network without indicating the PDU session to be used by the UE 110 (because of the non-allowed area).

If the location at which to page the UE 110 is included in the non-allowed area and if the PDU session used by the UE 110 is for an emergency service, for public safety, or for a voice call, the UE 110 inserts the corresponding PDU session ID into the service request.

If the location at which to page the UE 110 is included in the non-allowed area and if the PDU session used by the UE 110 is a PDU session allowed by the SMF 140 to be used in the non-allowed area, the UE 110 inserts the corresponding PDU session ID into the service request.

If the location at which to page the UE 110 is included in the non-allowed area and if the network slice used by the UE 110 is a slice for public safety or emergency service, the UE 110 inserts the PDU session ID used by the corresponding network slice into the service request.

After performing the determination operation, the UE 110 transmits the service request to the AMF 130 in step 590. If the UE 110 inserts the PDU session ID for a service other than the service that the AMF 130 determines to page into the service request, the AMF 130 does not activate the PDU session for the corresponding PDU session ID. This may be indicated by the service accept message transmitted to the UE 110.

Meanwhile, according to an embodiment of the disclosure, if the UE 110 makes a registration request in the non-allowed area, the UE 110 cannot use the PDU session in the non-allowed area, so the AMF 130 makes a request for deactivating the PDU session to the SMF 140 in order to deactivate the PDU session used by the UE 110. The request for deactivating the PDU session may mean that the AMF 130 may transmit information indicating current entry of the UE 110 into the non-allowed area to the SMF 140 without making an explicit request for deactivating the PDU session and the SMF 140 receiving the information determines whether to deactivate the PDU session on the basis of the information. According to a detailed embodiment of the disclosure, if the AMF 130 receives a registration request performed as the UE 110 enters the non-allowed area, the AMF 130 transmits a PDU session deactivation message including a cause value indicating that the UE 110 has entered the non-allowed area to the SMF 140. Alternatively, the AMF 130 transmits information indicating whether the UE 110 enters the non-allowed area, made known through the registration procedure, to the SMF 140 as UE reachability state information, and the SMF 140 may determine PDU session deactivation on the basis of the information. According to an embodiment of the disclosure, the SMF 140 receiving the information may determine whether the PDU session that the SMF 140 provides to the UE 110 is a PDU session that should be provided in the non-allowed area, and may transmit a response indicating rejection of PDU session deactivation along with a cause value, indicating that service is possible in the non-allowed area, to the AMF 130. After receiving the cause value and the response, the AMF 130 may determine that the corresponding PDU session can be serviced in the non-allowed area. After storing it, the AMF 130 determines that the PDU session can be serviced in the non-allowed area when the corresponding SMF 140 receives a downlink data notification and makes a request for paging the UE 110 to the AMF 130 in the future, and then pages the UE 110. Alternatively, the SMF 140 may determine that the PDU session which the SMF provides to the UE 110 is a PDU session that should be serviced in the non-allowed area, does not deactivate the PDU session, and transmit no response to the AMF 130. If downlink data for the corresponding PDU session is generated in the future, the SMF 140 provides the downlink data notification to the AMF 130.

Figure 6:
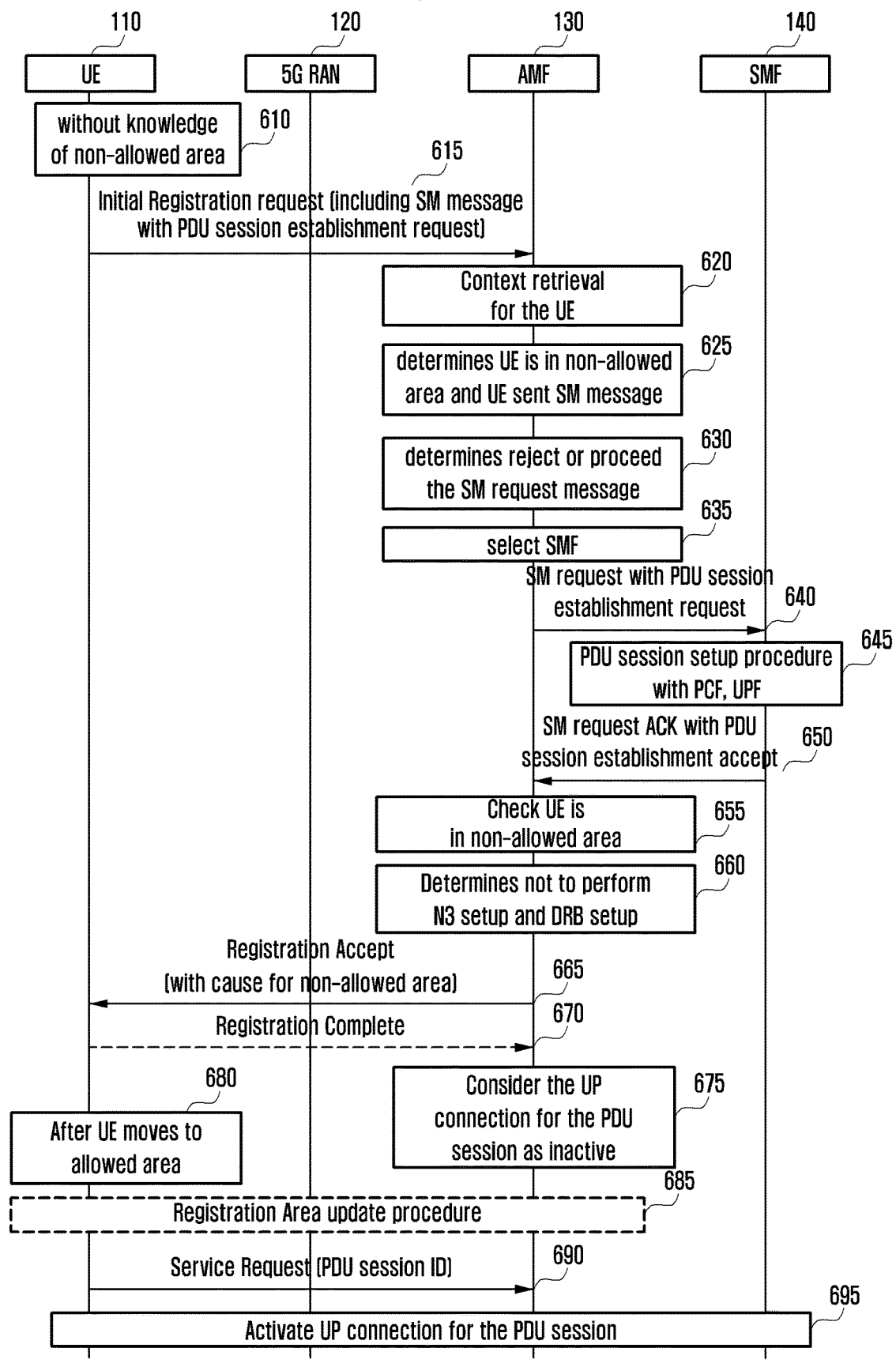
FIG. 6 illustrates a method by which a 5G network processes a session establishment request message transmitted by a UE in a non-allowed area and a method of activating a session by the UE in the future.

Embodiment 2-2 and FIG. 6

FIG. 6 illustrates a method by which a 5G network processes a session establishment request message transmitted by a UE in the non-allowed area and a method of activating a session by the UE in the future.

If the UE 110 receives information about the non-allowed area from the 5G network, the UE 110 may determine whether the UE 110 is to make a request for a message for establishing a session. However, if the UE 110 has not yet received the information about the non-allowed area, the UE may transmit a message for establishing a session.

According to an embodiment of the disclosure, it is assumed that the UE 110 is not aware of whether the current location of the UE 110 belongs to the non-allowed area in step 610, and it is assumed that the AMF 130 is aware that the current location of the UE 110 belongs to the non-allowed area.

Non-reception of the non-allowed area by the UE 110 may mean that the UE 110 has not yet performed the registration procedure. The UE 110 may transmit a request message for establishing the session while performing the registration procedure. According to the present embodiment, the UE 110 also transmits the request message for establishing the session while performing the registration procedure, which is a proposal for the case in which the AMF 130 determines that the area in which the UE 110 is located is the non-allowed area.

In step 615, the UE 110 transmits a registration request to the AMF 130 to access the 5G network. In order to indicate the situation in which there is no pre-allocated non-allowed area, the message is named an initial registration request for convenience. The initial registration request is not necessarily an initially transmitted registration request, but corresponds to a registration request transmitted by the UE 110, the current location of which is not identified to be the non-allowed area or not. The UE 110 inserts an SM message for PDU session establishment into the message and transmits the message. The PDU session establishment message is a message that makes a request for establishing a PDU session to be used by the UE 110. The UE 110 allocates an ID of the PDU session to be used by the UE and inserts the ID into the message. This is information that can be understood by the AMF 130.

After receiving the message, the AMF 130 identifies the ID of the UE 110 and then acquires the context of the UE 110 in step 620. If the AMF already has the context of the UE 110, the AMF identifies the context.

In order to determine whether the UE 110 transmitting the message is in the non-allowed area, the AMF 130 compares area information included in the registration request message transmitted by the UE 110 with non-allowed area information of the UE 110 included in the context of the UE 110 in step 625. Further, the AMF 130 determines whether the message includes an SM message.

According to an embodiment of the disclosure, the AMF 130, identifying that the UE 110 is located in the non-allowed area to transmit the registration request and that the message includes the SM message, may determine the following operation in step 630.

The AMF 130 determines whether the PDU session establishment request transmitted by the UE 110 can be processed in the non-allowed area. This may be a determination of whether a data network name (DNN) is for an emergency service or a regulatory prioritized service on the basis of the data network name (DNN) for the PDU session establishment request. If the DNN is for the emergency or regulatory prioritized service, it is determined to establish the PDU session. Alternatively, if the registration type of the UE 110 is an emergency, it is determined that the UE 110 can establish the PDU session even in the non-allowed area. If the above condition is not satisfied, the AMF 130 determines that the UE 110 cannot establish the PDU session and thus may not perform a procedure for an SM request. At this time (when the PDU session is not established), the AMF 130 may perform two operations. For example, the AMF 130 may identify policy or subscription information of the UE 110, and if it is identified that the corresponding UE 110 is a UE which is not able to perform registration without PDU session establishment, the UE 110 cannot establish the PDU session in the current location, so the AMF 130 may reject the registration request. Accordingly, the AMF 130 may transmit the registration rejection to the UE, in which case the registration rejection may include a cause indicating the non-allowed area, a cause indicating service area restriction, or a cause indicating PDU session establishment failure. In another operation, the AMF 130 may identify policy or subscription information of the UE 110, and if it is identified that the corresponding UE 110 is a UE capable of performing registration without PDU session establishment, may complete the registration procedure even though the UE 110 cannot establish the PDU session at the current location. Accordingly, the AMF 130 performs a procedure for accepting the registration request transmitted by the UE 110 and transmits a registration acceptance message to the UE 110. At this time, the AMF 130 may include a cause value indicating that the PDU session establishment requested by the UE 110 is rejected. The cause value may be a value indicating the non-allowed area or a value indicating service area restriction.

In a more advanced method according to an embodiment of the disclosure, if the UE 110 makes a request for establishing the PDU session in the non-allowed area, the AMF 130 may establish a PDU session that can be used by the UE 110 on the side of the core network but not allocate radio resources for the corresponding PDU session to the UE 110 so as to limit the use of the PDU session of the UE 110. This causes the SMF 140 and the UPF 145 to establish the PDU session for the UE 110 and to generate a context but results in non-establishment of the user plane connection for the PDU session between the base station 120 and the UE 110 and between the base station 120 and the UPF 145. In other words, although the UE 110 establishes the PDU session, an idle state results (user plane connection is inactive). Accordingly, there is an effect of reducing time and signaling as the UE 110 activates the existing PDU session to use the same without again performing the PDU session establishment procedure when the UE 110 enters the allowed area in the future.

The AMF 130, determining to establish the PDU session only on the side of the core network, selects the SMF 140 to which the SM message received from the UE 110 is transmitted in step 635.

After selecting the SMF 140, the AMF 130 transmits the SM message received from the UE 110 to the corresponding SMF 140 in step 640. The message includes a PDU session establishment request.

The SMF 140 performs a PDU session setup procedure with the UPF 145 and the PCF 141 according to the received SM message in step 645.

The SMF 140 transmits ACK to the AMF 130 to inform the AMF that the PDU session is established on the side of the core network in step 650.

According to an embodiment of the disclosure, the AMF 130 determines that the ACK is ACK of the SM message of the UE 110 in the non-allowed area in step 655.

According to an embodiment of the disclosure, the AMF 130 determines not to establish the connection (N3 connection) between the base station 120 and the UPF 145 and radio resources of the UE 110 according to the determination in the procedure in step 660.

The AMF 130 transmits a registration acceptance message to the UE 110 in step 665. According to an embodiment of the disclosure, the AMF 130 may indicate the cause of failure in the SM request of the UE 110 through the message. This may have a form such as session establishment request failure—cause: non-allowed area. Further, the AMF 130 inserts an ID of the PDU session, established on the side of the core network, into the message. The ID may be a PDU session ID included in the SM message piggybacking on the registration request by the UE 110.

The UE 110 may provide notification of reception of the registration acceptance message in step 670.

The UE 110 and the AMF have established the current PDU session but consider that a user plane connection is inactive in step 675.

The AMF 130 informs the SMF 140 that the user plane connection of the UE 110 is inactive, and thus the SMF 140 does not wait for the connection between the UE 110 and the base station 120. The SMF 140 considers the UE 110 to be in an idle state.

According to an embodiment of the disclosure, if the UE 110 enters the allowed area in the future in step 680, the UE 110 may activate the user plane connection for the PDU session established on the side of the core network through a request in step 695. In order to provide notification of entry into the allowed area before step 695, the UE 110 might perform a registration update procedure in step 685. In order to activate the user plane connection for the PDU session, the UE 110 transmits a service request message including the ID of the corresponding PDU session to the AMF 130 in step 690. The AMF 130 receiving the service request message makes a request for activating the user plane connection to the SMF 140 associated with the corresponding PDU session ID so as to allow the UE 110 to transmit and receive data through the PDU session in step 695.

In a situation according to another embodiment of the disclosure, if the UE 110 escapes the registration area allocated by the AMF 130, the UE 110 transmits a registration request to the AMF 130 to perform a registration area update procedure in step 615. When transmitting the registration request, the UE 110 may transmit an indication related to PDU session reactivation (for example, a PDU session ID) in order to reactivate the PDU session established by the UE. If the UE 110 enters a non-allowed area, the UE 110 should not transmit the PDU session reactivation indication. However, if the UE 110 is not aware of entry into a non-allowed area, the UE 110 may transmit the PDU session reactivation indication through the registration request. That is, the embodiment is implemented when the registration update procedure is performed due to movement of the UE 110 and when the corresponding UE 110 enters a non-allowed area as well as when the UE 110 performs the initial registration procedure.

After receiving the message, the AMF 130 identifies the ID of the UE 110 and then acquires a context of the UE 110 in step 620. If the AMF already has the context of the UE 110, the AMF identifies the context.

In order to determine whether the UE 110 transmitting the message is in a non-allowed area, the AMF 130 compares area information included in the registration request message transmitted by the UE 110 with non-allowed area information of the UE 110 included in the context of the UE 110 in step 625. Further, the AMF 130 identifies whether the message includes a PDU session reactivation indication (for example, one of a PDU session ID, a flag, or an identifier indicating reactivation of all PDU sessions). The AMF 130, identifying that the UE 110 is located in the non-allowed area to transmit the registration request and that the message includes an identifier for PDU session reactivation, may determine the following operation in step 630.

The AMF 130 determines whether the PDU session reactivation request transmitted by the UE 110 can be processed in the non-allowed area. This may be a determination of whether the corresponding data network name (DNN) is for an emergency service or a regulatory prioritized service after the DNN of the corresponding PDU session is identified on the basis of the ID of the PDU session for the PDU session reactivation request. If the DNN is for the emergency or regulatory prioritized service, it is determined to reactivate the PDU session. Alternatively, if the registration type of the UE 110 is an emergency, it may be determined that the UE 110 can reactivate the PDU session even in the non-allowed area. The AMF 130 determining that the PDU session can be reactivated transmits an N11 message that makes a request for reactivating the PDU session to the SMF 140 to prompt the PDU session reactivation. If the above conditions are not satisfied, the AMF 130 determines that the UE 110 cannot reactivate the PDU session and thus may not perform a procedure for the PDU session with the SMF. As described above, if the procedure for the PDU session reactivation is not performed, the AMF 130 may perform two operations. First, the AMF identifies policy or subscription information of the UE 110 and identifies that the corresponding UE 110 is a UE that is not capable of maintaining registration without a PDU session. Then, the AMF identifies a PDU session context of the corresponding UE 110 so as to determine whether the corresponding PDU session is released. The PDU session context may be session management message information for the release of the PDU session that is pended by the AMF 130 without waking up the UE 110 by the AMF 130 since the UE 110 is in the idle state and the SMF 140 has transmitted information indicating the release of the PDU session for the UE 110 to the AMF. After identifying that the PDU session that the UE 110 desires to reactivate has already been released and that the PDU session cannot be established in the non-allowed area, which is the current location, if it is determined that the UE 110 cannot maintain the registration state without at least one PDU session, the AMF 130 may reject the registration request. Accordingly, the AMF 130 may transmit the registration rejection to the UE 110, in which case the registration rejection may include a cause indicating the non-allowed area, a cause indicating service area restriction, or a cause indicating PDU session reactivation failure. Alternatively, the registration rejection may include a cause indicating that registration cannot be maintained without a PDU session, such as failure of registration because no PDU session exist. Further, the AMF 130 may indicate that the PDU session is released while transmitting the cause including the status of the PDU session used/established by the UE 110.

In another operation, the AMF 130 identifies policy or subscription information of the UE 110 and identifies that the corresponding UE 110 is a UE capable of performing registration without PDU session establishment. Further, if the AMF 130 receives a notification indicating that there is no PDU session that can be currently used by the UE 110 and that all PDU sessions that the UE 110 has established are released from the SMF 140, the AMF 130 may complete the registration procedure even though the UE 110 cannot reactivate the PDU session at the current location and all the PDU sessions are currently released. Accordingly, the AMF 130 performs a procedure for accepting the registration request transmitted by the UE 110 and transmits a registration acceptance message to the UE 110. At this time, the AMF 130 may include a cause value indicating that the PDU session reactivation requested by the UE 110 is rejected. The cause value may include a value indicating the non-allowed area, a value indicating service area restriction, or a value indicating PDU session reactivation failure. Further, the AMF 130 may include the status of the PDU session used/established by the UE 110 while transmitting the cause, and may provide notification that the corresponding PDU session is released.

Figure 8:
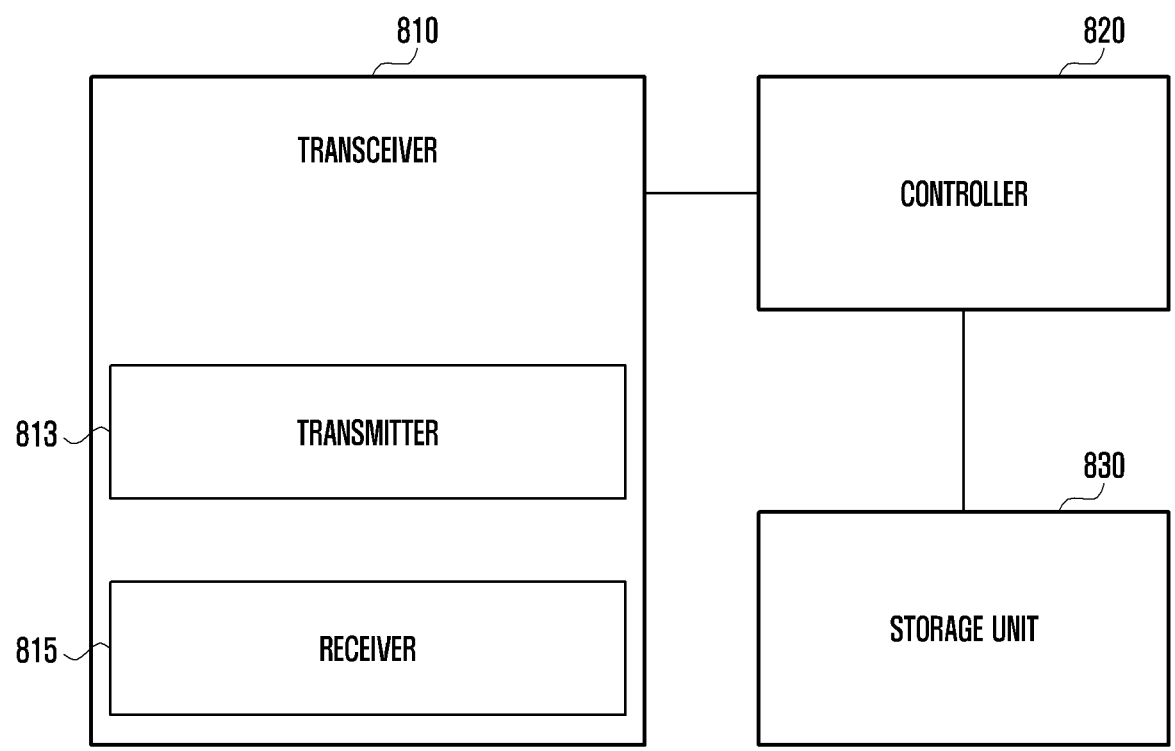
FIG. 8 is a block diagram illustrating a base station according to an embodiment of the disclosure.

FIG. 8 is a block diagram illustrating a base station according to an embodiment of the disclosure.

Referring to FIG. 8, a base station 120 according to an embodiment of the disclosure may include a transceiver 810 and a controller 820 for controlling the overall operation of the base station 120. The transceiver 810 may include a transmitter 813 and a receiver 815. The base station 120 may further include a storage unit 830.

The controller 820 of the base station 120 controls the base station 120 to perform one operation in the above-described embodiments. For example, the controller 820 of the base station 120 may perform control to receive a first message including information for maintaining the MICO-mode UE 110 in the connected state from the AMF 130, determine whether to release the connection of the MICO-mode UE 110 on the basis of the information, and if it is determined to release the connection of the MICO-mode UE 110, transmit a second message that makes a request for releasing the connection from the AMF 130. The controller 820 may perform control to configure a timer for a connection maintenance time of the MICO-mode UE 110 on the basis of the information, and if the timer expires, transmit the second message, which makes a request for releasing the connection to the AMF 130.

The transceiver 810 of the base station 120 may transmit and receive a signal according to one operation in the above-described embodiments.

Meanwhile, the controller 820 and the transceiver 810 do not have to be implemented as separate modules but may be implemented as one element such as a single chip. The controller 820 and the transceiver 810 may be electrically connected.

For example, the controller 820 may be a circuit, an application-specific circuit, or at least one processor. Operation of the base station may be implemented as a memory device (the storage unit 830) storing the corresponding program code is included in a predetermined element within the base station 120. That is, the controller 820 may perform the operations by reading and executing the program code stored in the memory device through a processor or a central processing unit (CPU).

Figure 9:
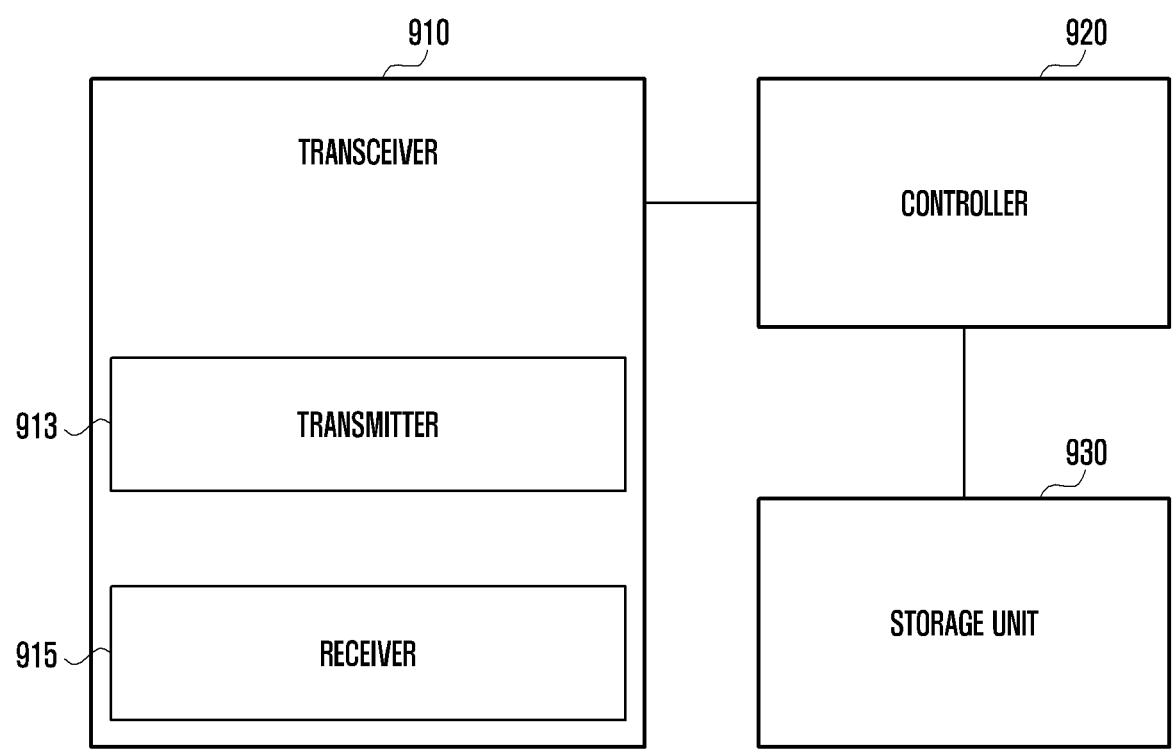
FIG. 9 is a block diagram illustrating an AMF according to an embodiment of the disclosure.

FIG. 9 is a block diagram illustrating an AMF according to an embodiment of the disclosure.

Referring to FIG. 9, an AMF 130 according to an embodiment of the disclosure may include a transceiver 910 and a controller 920 for controlling the overall operation of the AMF 130. The transceiver 910 may include a transmitter 913 and a receiver 915. The AMF 130 may further include a storage unit 930.

The controller 920 of the AMF 130 controls the AMF 130 to perform one operation in the above-described embodiments. For example, the controller 920 of the AMF 130 may perform control to transmit a first message including information for maintaining the MICO-mode UE 110 in the connected state to the base station 120, and if it is determined to release the connection of the MICO-mode UE 110 on the basis of the information, receive a second message that makes a request for releasing the connection from the base station 120. When a timer for a connection maintenance time of the MICO-mode UE 110, configured on the basis of the information, expires, the controller 920 may receive the second message, which makes a request for releasing the connection from the base station 120.

The transceiver 910 of the AMF 130 may transmit and receive a signal according to one operation in the above-described embodiments.

Meanwhile, the controller 920 and the transceiver 910 do not have to be implemented as separate modules but may be implemented as one element, such as a single chip. The controller 920 and the transceiver 910 may be electrically connected.

For example, the controller 920 may be a circuit, an application-specific circuit, or at least one processor. Operations of the AMF 130 may be implemented as a memory device (the storage unit 930) storing the corresponding program code is included in a predetermined element within the UE. That is, the controller 920 may perform the operations by reading and executing the program code stored in the memory device through a processor or a central processing unit (CPU).

Other network entities (for example, the UE 110, the SMF 140, the UPF 145, the AS 149, the PCF 141, and the NEF 147) may include a transceiver and a controller for controlling the overall operation of the network entities. The transceiver may include a transmitter and a receiver, and the network entities may further include a storage unit. The controller controls the network entities to perform one operation in the above-described embodiments. The controller and the transceiver do not have to be implemented as separate modules but may be implemented as one element, such as a single chip, and the controller and the transceiver may be electrically connected.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, the base station and the UE may operate on the basis of a combination of portions of embodiment 1 and embodiment 2 of the disclosure. Although the embodiments have been presented on the basis of LTE/LTE-A systems, other modified examples based on the technical idea of the embodiments can be applied to other systems such as 5G and NR systems.

What is claimed is:

1. A method performed by a base station in a communication system, the method comprising:
 receiving, from an access and mobility management function (AMF), a message including first information indicating that a mobile initiated communication only (MICO) mode is allowed for a terminal and second information on a time value for maintaining the terminal in a radio resource control (RRC) connected state;

in case that the time value is larger than a value of an RRC inactive timer, determining to release an N2 connection between the base station and the AMF after a timer according to the time value is expired, and transmitting, to the AMF, a request message for releasing the N2 connection; and in case that the time value is not larger than the value of the RRC inactive timer, determining to release the N2 connection between the base station and the AMF after the timer according to the value of the RRC inactive timer is expired, and transmitting, to the AMF, the request message for releasing the N2 connection, wherein the RRC inactive timer is used for determining an RRC connection inactivity of the terminal.

2. The method of claim 1, wherein the time value or the value of the RRC inactive timer is applied for maintaining the terminal in the RRC connected state.

3. The method of claim 1, further comprising:
releasing a data radio bearer and radio resources allocated for the terminal.

4. The method of claim 1, wherein the second information is associated with the MICO mode.

5. A method performed by an access and mobility management function (AMF) in a communication system, the method comprising:

transmitting, to a base station, a message including first information indicating that a mobile initiated communication only (MICO) mode is allowed for a terminal and second information on a time value for maintaining the terminal in a radio resource control (RRC) connected state;

receiving, from the base station, a request message for releasing an N2 connection between the AMF and the base station after a timer according to the time value is expired, in case that the time value is larger than a value of an RRC inactive timer; and receiving, from the base station, the request message for releasing the N2 connection after the timer according to the value of the RRC inactive timer is expired, in case that the time value is not larger than the value of the RRC inactive timer, wherein the RRC inactive timer is used for determining an RRC connection inactivity of the terminal.

6. The method of claim 5, wherein the time value or the value of the RRC inactive timer is applied for maintaining the terminal in the RRC connected state.

7. The method of claim 5, further comprising:
receiving, from a user data management (UDM), information on a time for which the terminal stays in the RRC connected state; and determining the second information based on the information on the time.

8. The method of claim 5, wherein the second information is associated with the MICO mode.

9. A base station in a communication system, the base station comprising:
a transceiver; and
a controller configured to:
receive, from an access and mobility management function (AMF), a message including first information indicating that a mobile initiated communication only (MICO) mode is allowed for a terminal and second information on a time value for maintaining the terminal in a radio resource control (RRC) connected state, in case that the time value is larger than a value of an RRC inactive timer, determine to release an N2 connection between the base station and the AMF after a timer according to the time value is expired, and transmit, to the AMF, a request message for releasing the N2 connection, and in case that the time value is not larger than the value of the RRC inactive timer, determine to release the N2 connection between the base station and the AMF after the timer according to the value of the RRC inactivity inactive timer is expired, and transmit, to the AMF, the request message for releasing the N2 connection, wherein the RRC inactive timer is used for determining an RRC connection inactivity of the terminal.

10. The base station of claim 9, wherein the time value or the value of the RRC inactive timer is applied for maintaining the terminal in the RRC connected state.

11. The base station of claim 9, wherein the controller is further configured to release a data radio bearer and radio resources allocated for the terminal.

12. The base station of claim 9, wherein the second information is associated with the MICO mode.

13. An access and mobility management function (AMF) in a communication system, the AMF comprising:
a transceiver; and
a controller configured to:
transmit, to a base station, a message including first information indicating that a mobile initiated communication only (MICO) mode is allowed for a terminal and second information on a time value for a maintaining the terminal in a radio resource control (RRC) connected state, control the transceiver to receive, from the base station, a request message for releasing an N2 connection between the AMF and the base station after a timer according to the time value is expired, in case that the time value is larger than a value of an RRC inactive timer, and control the transceiver to receive, from the base station, the request message for releasing the N2 connection after the timer according to the value of the RRC inactive timer is expired, in case that the time value is not larger than to the value of the RRC inactive timer, wherein the RRC inactive timer is used for determining an RRC connection inactivity of the terminal.

14. The AMF of claim 13, wherein the time value or the value of the RRC inactive timer is applied for maintaining the terminal in the RRC connected state.

15. The AMF of claim 13, wherein the controller is further configured to:
receive, from a user data management (UDM), information on a time for which the terminal stays in the RRC connected state, and determine the second information based on the information on the time.

16. The AMF of claim 13, wherein the second information is associated with the MICO mode.

* * * * *